(12) United States Patent
Ziering et al.

(10) Patent No.: US 10,414,553 B2
(45) Date of Patent: Sep. 17, 2019

(54) AIRTIGHT CHILD RESISTANT CASE WITH ELONGATED COMPARTMENTS

(71) Applicant: PAQ, LTD, Carbondale, CO (US)

(72) Inventors: Cody Ziering, Carbondale, CO (US); Brett Gelfand, Carbondale, CO (US); Mark Rottenberg, Reisterstown, MD (US)

(73) Assignee: PAQ HOLDINGS, LLC, Boca Raton, FL (US)

( * ) Notice: Subject to any disclaimer, the term of this patent is extended or adjusted under 35 U.S.C. 154(b) by 460 days.

(21) Appl. No.: 15/175,985

(22) Filed: Jun. 7, 2016

(65) Prior Publication Data

US 2017/0349338 A1     Dec. 7, 2017

(51) Int. Cl.
| B65D 43/22 | (2006.01) |
| B65D 25/04 | (2006.01) |
| B65D 43/16 | (2006.01) |
| B65D 85/10 | (2006.01) |
| A24F 15/10 | (2006.01) |

(Continued)

(52) U.S. Cl.
CPC .............. B65D 43/22 (2013.01); A24F 15/10 (2013.01); B65D 25/04 (2013.01); B65D 43/16 (2013.01); B65D 85/10 (2013.01); B65D 25/10 (2013.01); B65D 65/466 (2013.01); B65D 2215/02 (2013.01); Y02W 30/807 (2015.05); Y02W 90/13 (2015.05)

(58) Field of Classification Search
CPC ........ B65D 43/22; B65D 43/16; B65D 25/04; B65D 25/10; B65D 85/10; B65D 85/1036; B65D 83/02; B65D 2251/105; A24F 15/00; A24F 15/12; A24F 15/14; A24F 15/16; A24F 15/18; A24F 15/20; A24F 13/24; A24F 13/26; A24F 25/02; A45C 11/22; A45C 11/18
USPC ............ 206/265, 242, 308.3, 259, 261, 246; 220/813, 806; 131/242, 250; D27/189; D3/215, 294
See application file for complete search history.

(56) References Cited

U.S. PATENT DOCUMENTS 1,053,758 A * 2/1913 Turnbull .................. A24F 15/12
                                                                  206/269
1,192,707 A * 7/1916 Thorndike .............. A24F 15/12
                                                                  206/251

(Continued)

*Primary Examiner* — Chun Hoi Cheung
*Assistant Examiner* — Brijesh V. Patel
(74) *Attorney, Agent, or Firm* — Bednarek Legal, PLLC; Michael D. Bednarek

(57) ABSTRACT

A package for preserving freshness and storing elongated items. The package is preferably biodegradable, substantially airtight, child resistant and reusable. Various seal constructions are described for sealing a case body portion against a case lid portion. The respective sealing surfaces of the case lid portion and case body portion are complementary, but spaced. A continuous elastomeric seal is provided in the seal space between the complementary sealing surfaces. The seal is configured to be compressed along the entire sealing length of the sealing surface when the case lid portion is pivoted into the latched position. The compressed elastomeric seal provides a spring force that retains the latch in the latched position and a spring force that is resolved into sealing vectors perpendicular to the sealing surface along the entire length of the sealing surface to ensure a seal along the sealing surface.

20 Claims, 12 Drawing Sheets

(51) Int. Cl.
*B65D 65/46* (2006.01)
*B65D 25/10* (2006.01)

(56) References Cited

U.S. PATENT DOCUMENTS

| | | | |
|---|---|---|---|
| 1,496,474 A | 6/1924 | Lloyd | |
| 1,522,633 A * | 1/1925 | Kister | A45C 11/22 206/269 |
| 1,574,566 A * | 2/1926 | Fiske | A24F 15/12 206/256 |
| 1,853,760 A * | 4/1932 | Davis | A24F 15/12 206/259 |
| 1,997,043 A * | 4/1935 | Clark | A24F 15/18 131/242 |
| 2,081,930 A * | 6/1937 | Hoffman | A45C 11/22 206/269 |
| 2,163,828 A | 6/1939 | Chalmers | |
| 2,283,856 A | 5/1942 | Hoenig | |
| 2,491,617 A | 12/1949 | Lebach | |
| 2,528,743 A * | 11/1950 | Eggebrecht | A24F 15/16 206/250 |
| 2,867,369 A | 1/1959 | Cernera | |
| 2,960,264 A | 11/1960 | Walter | |
| 2,983,424 A | 5/1961 | Glass | |
| 3,165,249 A * | 1/1965 | Peck | A24F 15/20 206/238 |
| 3,223,275 A | 12/1965 | Rice | |
| 3,226,010 A | 12/1965 | Rogers, Jr. | |
| 4,081,126 A | 3/1978 | Barnard | |
| 4,541,527 A * | 9/1985 | Nagel | G11B 33/0433 206/265 |
| D284,606 S * | 7/1986 | Koontz | G11B 23/02 D27/189 |
| 4,867,302 A * | 9/1989 | Takahashi | G11B 23/02 206/755 |
| 4,986,415 A * | 1/1991 | Posso | G11B 33/0433 206/308.3 |
| 5,044,550 A | 9/1991 | Lamm | |
| 5,074,412 A | 12/1991 | White | |
| 5,097,948 A | 3/1992 | Campbell | |
| D366,344 S * | 1/1996 | Mak | A24F 15/12 D27/188 |
| D379,552 S * | 5/1997 | Vokebe | A24F 15/12 206/242 |
| 5,699,903 A | 12/1997 | Focke et al. | |
| 6,164,444 A | 12/2000 | Bray et al. | |
| 6,446,793 B1 * | 9/2002 | Layshock | A45C 11/22 224/604 |
| 7,124,883 B1 | 10/2006 | Thomas et al. | |
| D606,307 S * | 12/2009 | Gauss | A24F 15/12 D3/215 |
| 8,540,113 B2 * | 9/2013 | Bailey | B65D 43/164 206/240 |
| 8,602,210 B2 * | 12/2013 | Milner | A24F 15/12 131/250 |
| 2004/0251148 A1 * | 12/2004 | Bernhard | A24F 15/12 206/242 |
| 2004/0256253 A1 * | 12/2004 | Henson | A24F 15/12 206/242 |
| 2005/0116003 A1 * | 6/2005 | Butler | A45C 11/22 224/604 |

\* cited by examiner

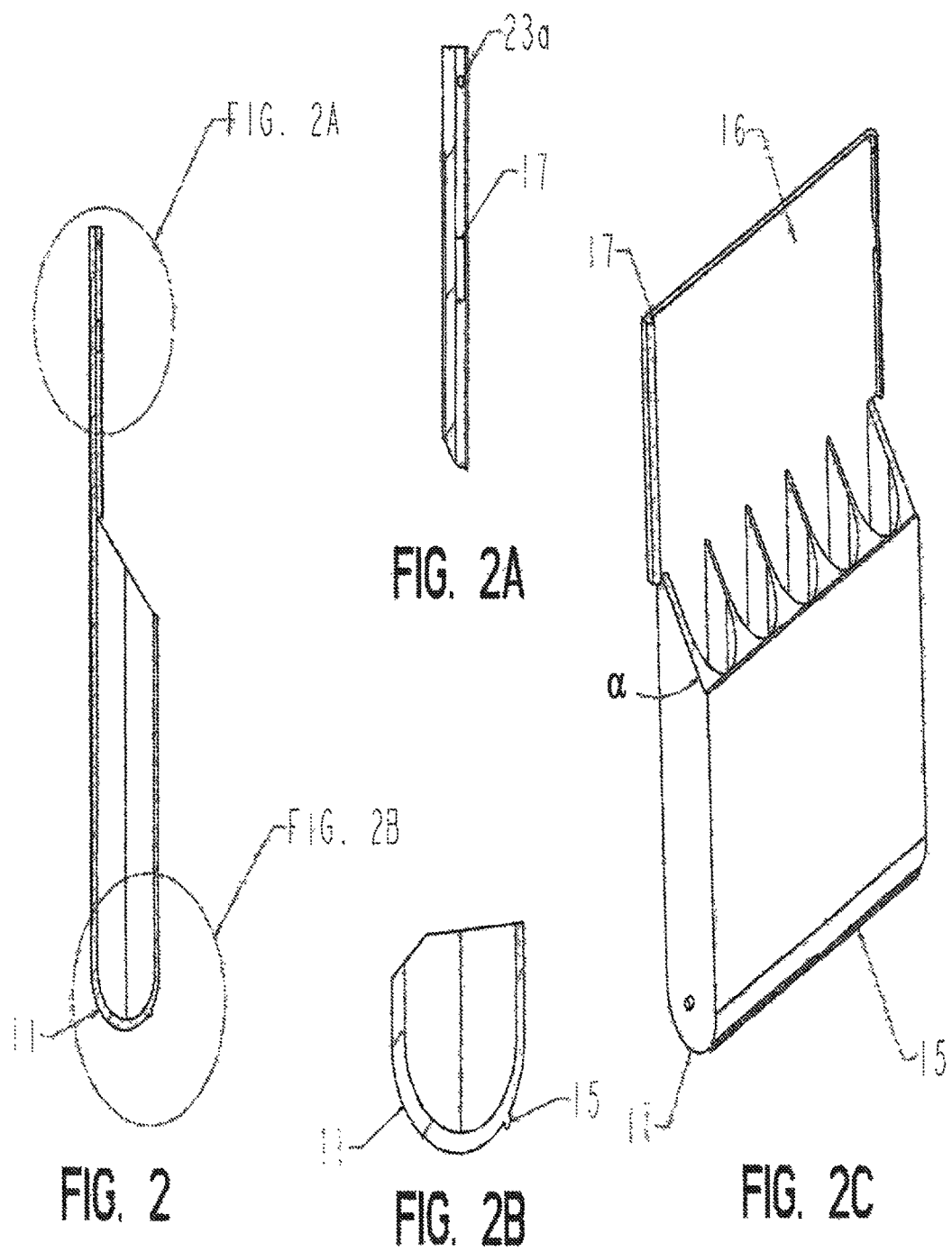

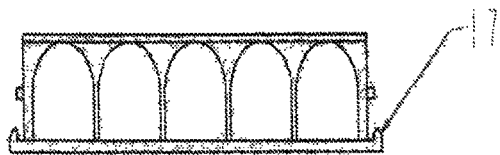
FIG. 2D
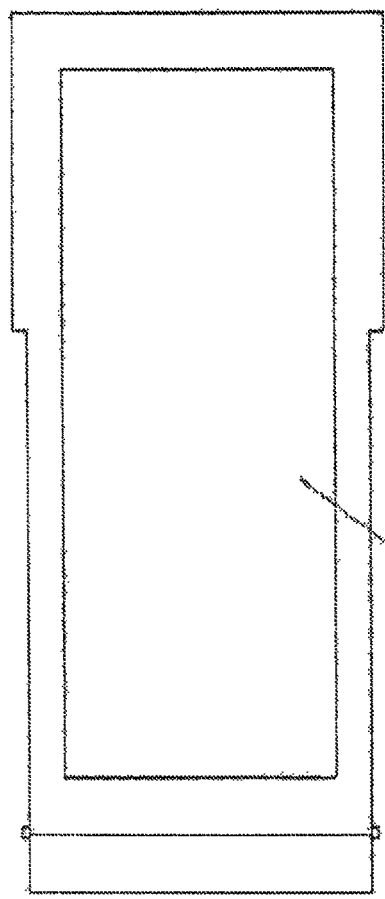
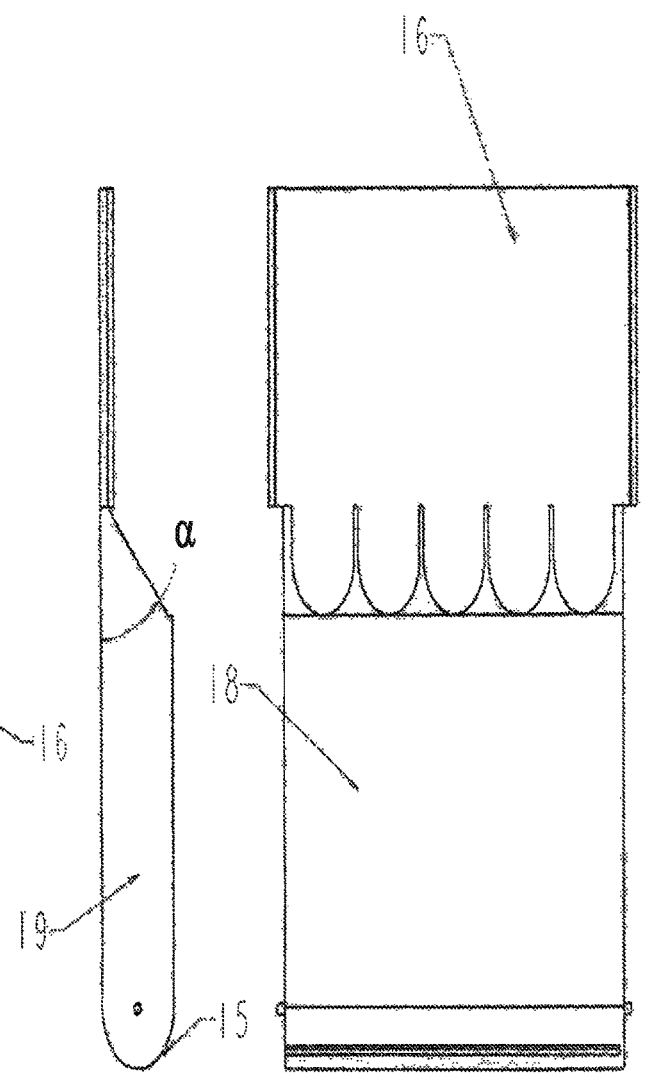
FIG. 2E    FIG. 2F    FIG. 2G

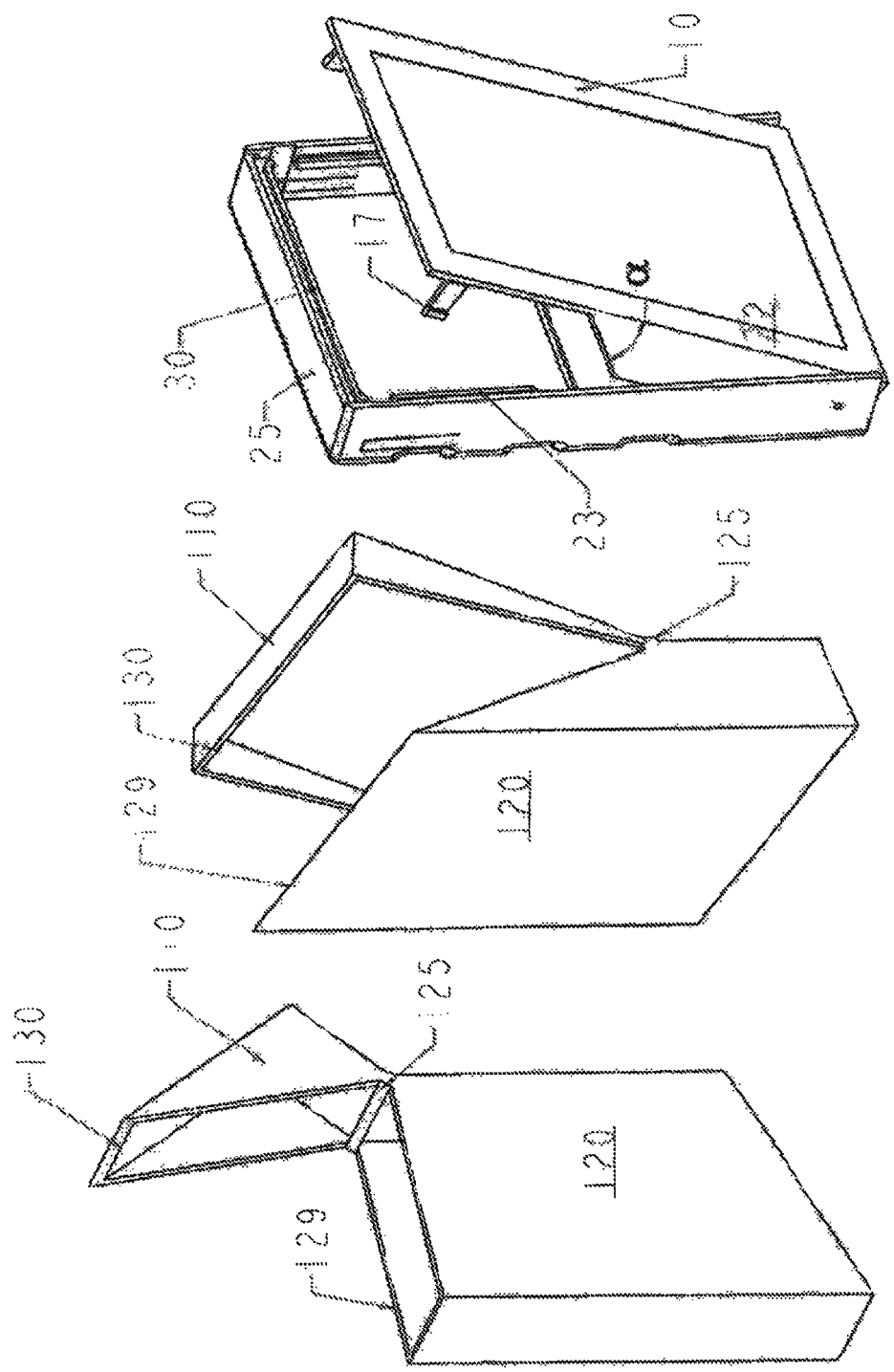

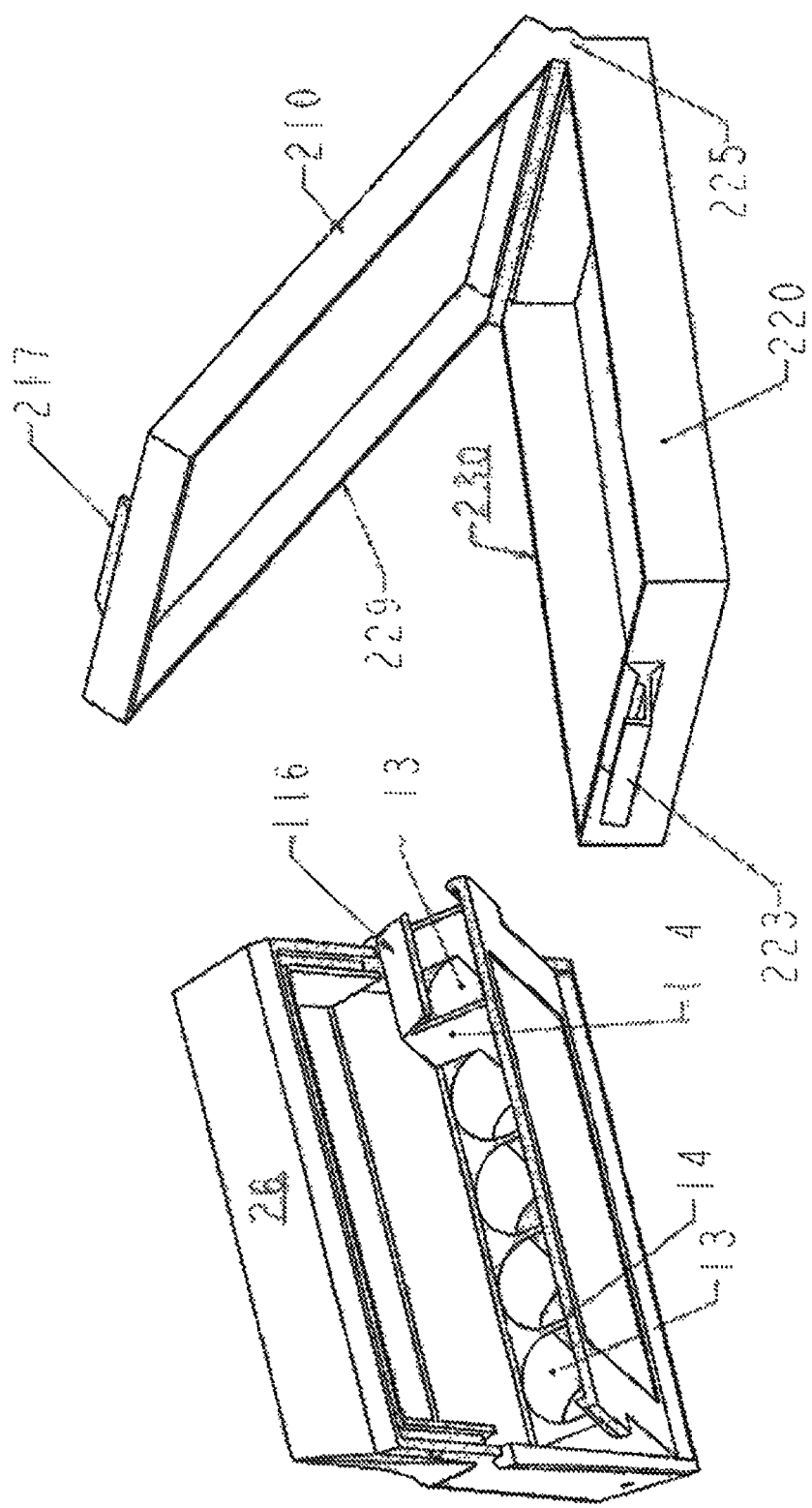

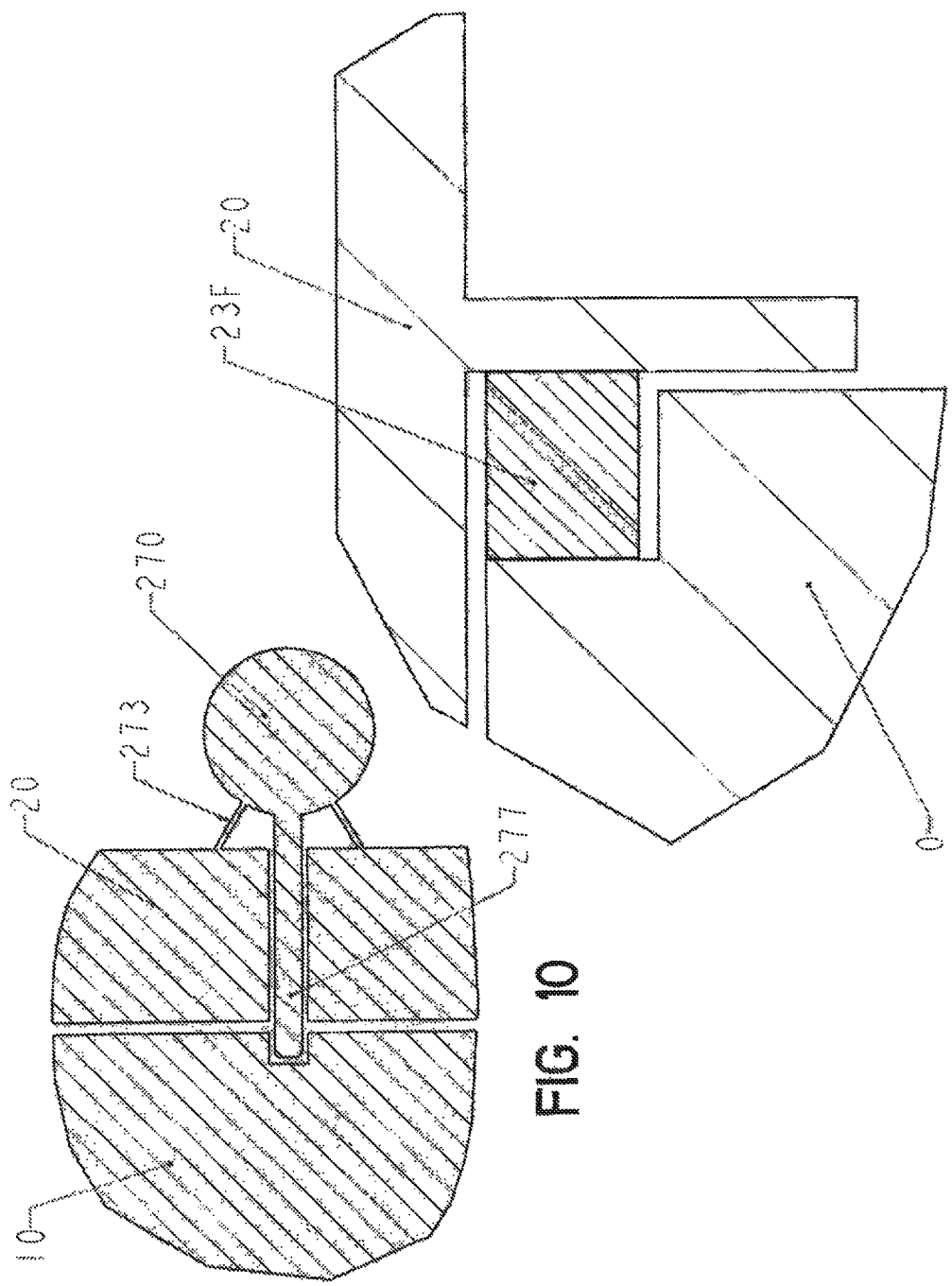

AIRTIGHT CHILD RESISTANT CASE WITH ELONGATED COMPARTMENTS

FIELD OF THE INVENTION

The present invention relates generally to a substantially airtight child resistant case for storing and preserving the freshness of elongated rod shaped articles such as cigarettes. More specifically, the present invention is directed to a package including a child resistant latching closure, sealing construction and compartmentalized interior for storing elongated products.

BACKGROUND

The term cigarette, originally a French term for small cigar, is now most commonly used to refer to a tobacco cigarette. As used herein, however, the term encompasses other structurally similar products, i.e., those with a paper or leaf wrapping containing processed leaf and other substances such as tobacco or cannabis (colloquially referred to as "joints"). Cigarettes may be machine rolled or hand rolled usually using paper or whole-leaf tobacco. Tobacco wrapped in whole leaf tobacco is typically referred to as a cigar and if the product is modified to include cannabis it is colloquially referred to as a "blunt." Regardless of the composition and wrapping, cigarettes are similar in that they have an elongated substantially cylindrical rod shape that is not designed to withstand significant bending or crushing forces. Accordingly there is a need to package cigarettes in containers that reduce bending or crushing forces. Machine rolled cigarettes are typically uniform in size and shape and are often packaged in a way that relies on adjacent cigarettes to provide structural in the package. Hand rolled and other non-uniform products cannot be as tightly packaged.

In some locations, the states of Colorado and Washington, for example, retail (non-medical) sale of marijuana products is permitted. Product is sold in a variety of forms including "joints" and "blunts," which, as noted above, are forms of cigarette as used herein. With such products, there may be additional packaging concerns beyond structural integrity of the products. Providing a substantially airtight packaging helps preserve freshness. Also, child resistant packaging is beneficial and, in some instances, mandated by law. In Colorado, for example, child-resistant packaging is required for both recreational and medical cannabis products.

Various multiple-compartment cigarette packaging techniques are known in the prior art. Typically, such prior art packages and containers are box-shaped, made of a paper, cardstock or metallic material and contain a hinge associated with each of one or more lids. The compartments are typically sealed as a single package or are individually sealed to preserve freshness, but the seal is often a one-time seal that is destroyed when opened. U.S. Pat. No. 2,283,856 to Hoenig; U.S. Pat. No. 2,983,424 to Glass; U.S. Pat. No. 3,226,010 to Rogers; and U.S. Pat. No. 5,699,903 to Focke et al. disclose multi-compartment, individually sealed packages for containing more than one group, brand or type of cigarette. U.S. Pat. No. 2,983,424 to Glass and U.S. Pat. No. 3,226,010 to Rogers show two-compartment, dual-lid cigarette packages with the separate lids and hinges on the same side of the package. U.S. Pat. No. 2,163,828 to Chalmers and U.S. Pat. No. 4,081,126 to Barnard disclose two-compartment cigarette packages with a single hinged lid covering both openings on the same side of the package. U.S. Pat. No. 5,074,412 to White and U.S. Pat. No. 5,699,903 illustrate a rectangular, two-compartment cigarette package with hinged lids on opposite sides of the package. U.S. Pat. No. 6,164,444 to Bray et al., which discloses a typical hinged-lid, box-shaped container that is made from a "rigid card material." Further examples of cigarette or tobacco packages made of a paper or cardstock material are disclosed in U.S. Pat. Nos. 1,496,474; 2,960,264; 5,044,550; and 5,097,948. Other materials, such as metals, woods and plastic, have also been suggested for use in multi-compartment containers for making crushproof and freshness-preserving cigarette containers. U.S. Pat. No. 2,867,369 to Cernera and U.S. Pat. No. 3,223,275 to Rice, Jr. disclose cigarette containers that may be made of various materials, such as plastic, wood, metal and cardboard. U.S. Pat. No. 7,124,883 to Thomas et al. discloses a package or container for holding two or more types or brands of smoking articles, such as cigarettes, having a generally rectangular shape with two openings on opposite sides of the container and a method of making the same is disclosed. The container has two lids, a body, and a separation member that divides the container into two or more compartments. U.S. Pat. No. 5,699,903 to Focke et al. discloses "trough-like recesses" for reducing movement of individual cigarettes and providing structural support. U.S. Pat. No. 2,491,617 describes a case in which each cigarette is held under slight spring pressure applied longitudinally to an end thereof and is partially ejected from the case when a movable band containing an opening is moved into alignment with a particular cigarette.

SUMMARY

A container comprising a case body portion and case lid portion, a sealing structure and latching and or locking structures. The case body portion has an open box rectangular cuboid configuration and a continuous sealing surface provided on the interior of the case portion. A case lid portion is pivotally mounted in the case body portion. The case lid portion has a continuous sealing surface and includes a storage chamber separated into at least three compartments. Latching and or locking components are provided on the case body portion and case lid portion so that the components can be moved from a latching position to a release position. The respective sealing surface of the case lid portion is substantially complementary to the sealing surface of the case body portion, but dimensioned to provide a seal space between the case body portion and the case lid portion.

A continuous elastomeric seal is provided in the seal space between the complementary sealing surfaces. The seal is configured to be compressed along the entire sealing length of the sealing surface when the case lid portion is pivoted into the latched position. The compressed elastomeric seal provides a spring force that retains the latch in the latched position and a spring force that is resolved into sealing vectors perpendicular to the sealing surface along the entire length of the sealing surface to ensure a seal along the sealing surface. In particular, parallel side walls connecting the front wall and back wall of the case lid portion have an inclined upper edge and a sealing surface defined at the upper edge and the inclined upper edge and sealing surface extends at an acute angle of inclination relative to the straight back edge and wherein the upper edge and sealing surface extend at a complementary obtuse angle of inclination relative to the straight front edge such that a portion of a sealing force applied in a direction perpendicular to the back wall is resolved into a sealing vector that is perpendicular to the inclined upper edge. The continuous sealing surface preferably extends at an angle of between 30° and 60° from one edge of the side wall toward the opposite edge of the side wall.

In the context of providing a substantially airtight child resistant case for storing and preserving the freshness of elongated rod shaped articles such as cigarettes, cigarette substitutes, vaporizers and e-cigarettes other advantageous features are described. For example, the continuous sealing surface extends along a portion of the side walls is between 30-70% of the length of the side walls to accommodate a stable yet accessible storage chamber construction. The continuous sealing surface extends at an angle of between 30° and 60° from one edge of the side wall toward the opposite edge of the side wall to optimize the balance between sealing vector and case dimensions. Likewise, the pivot openings in the side walls are preferably provided at a location that is substantially equidistant from the front wall, the back wall and the bottom wall. The front wall of the case lid portion has height that is in the range of 30-70% of the height of the back wall and the case lid portion has height that is less than 50% of the height of the back wall to balance support and accessibility.

A pivot restriction detent may be provided on the partially cylindrical bottom wall of the case lid portion to restrict the range of pivoting from the closed position. The pivot restriction detent preferably restricts the range of pivoting from the closed position to an open position that is between 15°-30° from the closed position.

The body latch portion may be configured as an integral portion of each of the two parallel side walls that is spaced from the back, top and bottom side walls so that the body latch portions may be flexed inward by application of release force to move the body latch portion to the release position and wherein the elasticity of the side walls moves the latch portions toward the latched position when the release force is removed. The body latch portion may also be configured as an integral portion of the top wall spaced from the back and side walls so that the body latch portion may be flexed down by application of release force to move the body latch portion to the release position. The elasticity of the top wall moves the latch portion toward the latched position when the release force is removed. In addition, a closure detent may be provided to inhibit movement of the lid from the closed position to an open position so that a user must apply a moderate force to move the lid past the detent.

The case may include an integral locking pin construction having a knob portion having a locking pin extending therefrom through a hole in the case body portion and a plurality of elastic ligaments extending from the knob to the case body portion. The ligaments are configured to provide elasticity sufficient to permit displacement of the locking pin from a locking position to a release position, as well as to maintain a locked position when no forces are applied.

The storage chamber of the case lid portion is airtight except at the opening that defines the sealing surface. A plurality of divider walls separate the chamber into at least three discrete compartments each having a length, width and depth to hold elongated product. The depth is preferable at least three times length or width of the chamber. An extended divider wall may be provided to define an extended compartment and an integral lid may be connected to the extended compartment by a living hinge. The seal is secured to the case body portion and pressed into contact with the case lid portion when the case lid portion is moved into the latched position. The seal preferably comprises an extrusion of compressible material that is a closed shape substantially polygonal shape.

BRIEF DESCRIPTION OF THE DRAWINGS

FIG. 2 is as side profile of the case lid portion.
FIG. 2A is as side profile of an area of the case lid portion indicated in FIG. 2.
FIG. 2B is as side detail of an area of the case lid portion indicated in FIG. 2.
FIG. 2C is a back perspective view of the case lid portion showing five distinct compartments.
FIG. 2D is as a top plan view of the case lid portion.
FIG. 2E is as a front plan view of the case lid portion.
FIG. 2F is as side plan view of the case lid portion.
FIG. 2G is as back plan view of the case lid portion.
FIG. 4 is a perspective view of a side hinged case.
FIG. 5 is a perspective view of a back hinged case.
FIG. 6 is a perspective view of a double latched case.
FIG. 8 is a top perspective view of a case that has an extended compartment.
FIG. 9 is a perspective view of a case having an alternative top latch.
FIG. 10 is a sectional view of an integral pin lock constriction.
FIG. 11 is a sectional view of a friction seal construction.

DETAILED DESCRIPTION

Figure 1B:
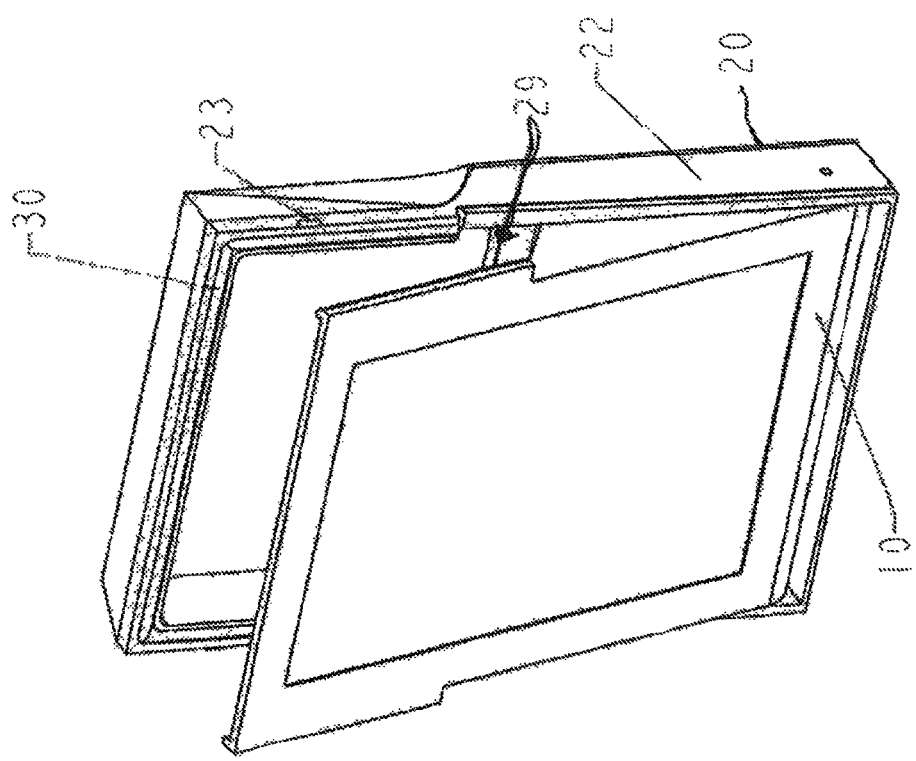
FIG. 1B is a front perspective view of the case of FIG. 1A in an open position.

FIGS. 1A-1H depict various view of an exemplary case according to the present invention. As shown the case comprises a case lid portion 10, a case body portion 20 and a seal 30. The case lid portion 10 is dimensioned to nest within the case body portion 20. The case lid portion 10 is pivotally supported within the dimensioned to nest within the case body portion 20 for movement between an open position (shown in FIGS. 1A, 1B, 1E, 1F and 1H) and a closed position (shown in FIGS. 1C and 1D). Either or both of the case lid portion 10 and the case body portion 20 may include a stop (detent) 15 to limit the range of pivotal movement between the case lid portion 10 and the case body portion 20. The inside surface of the case lid portion 10 is provided with a plurality of elongated compartments 13 for containing individual cigarettes.

In the closed position, the case is preferably substantially hermetically sealed to substantially limit airflow and provide a substantially airtight environment for preserving the freshness of stored product. While complete hermetic sealing may not be achievable, the use of a continuous compressed elastomer and or magnetic seal provides an enclosure that is water resistant, splash proof, airflow resistant to be dust tight. Water resistant as used here generally corresponds to water resistance at 3 atm, i.e., suitable for everyday use, splash/rain resistant, but not necessarily suitable for extended immersion in water or water shower. Dust tight means dust above a certain physical size cannot get in and splash proof generally means that the product could be handled and used in rainy weather for an extended period. To retain the case in the closed position a latch or similar closure is provided. In the case shown in FIGS. 1A-1H, case lid portion 10 includes a latching lip 17 and the case body portion 20 includes a latch 23 that is engaged by the lip 17 to retain the lid portion in the closed position. Releasing the case lid portion from the latched position preferably requires two distinct actions, for example, if the latch is located at the top of the case, pressing the top surface of the case body down to recess the latch and pushing the lip 17 of the case lid portion way from the recessed latch 23. Another example of two distinct actions, when latches are on the parallel side walls, is pushing both of the parallel side walls 22 inward (in opposite directions) at once.

To substantially limit airflow and provide a substantially airtight environment in the case shown in FIGS. 1A-1H, a seal is achieved by providing an elastomeric material 30 (i.e., a material that softer/more compressible than the case material) material in the seal space between complementary sealing surfaces provided on the case lid portion 10 and the case body portion 20. The seal 30 may be secured to the case body portion 20 as shown and pressed against the case lid portion 10 as shown or, alternatively, provided on the case front and pressed against the sealing surface of the case back. A compressible material has a closed shape that may be substantially polygonal or more free form may be used. To provide a substantially hermetic seal however the compressible material should extend continuously between the adjacent sealing surfaces. The seal 30 may be made of a magnetic vinyl or similar flexible magnetic surface that is magnetically attracted to the adjacent sealing surface so as to provide a tight seal between adjacent sealing surfaces. The elastomeric seal 30 is compressed when the lid pivoted into the latched position. The elastomeric spring force then retains the latch in the latched position and ensures a tight seal along the sealing source. The angled edge ensures that a significant portion of the elastomer force is used for sealing action.

More specifically, the elastomer of the seal 30 is compressed as the case lid portion 10 is latched to the case body portion. Once latched, the elastomer remains in a somewhat compressed state and exerts a force along the entire perimeter of the adjacent sealing surfaces. An opposing force presses the latch 23 and lip 17 against one another to retain the latch in the closed position. Because the angled edges of the adjacent sealing surfaces (angle α), the return force of the compressed elastomer resolves into a sealing vector (a force pressing the elastomer into the adjacent sealing surface) along the entire closed three dimensional polygonal path of the seal. An additional latching force may be obtained if the top of the case is elastomeric or elastic enough that the latch 23 must be depressed to move the lip into the latching position. The "spring back" force of the top of the case will push the lip and the latch into engagement and vectors of the opposing force will resolve to sealing vectors to ensure a tighter seal. Thus, the case functions as a reusable substantially airtight child resistant cigarette container with a plurality of elongated compartments for containing individual cigarettes FIGS. 2-2G further depict details of the case lid portion 10 depicted in FIGS. 1A-1H. As best shown in FIG. 2C, the case lid portion 10 has a back wall 16 substantially complementary to the opening defined by the top, bottom and side walls of the case portion 20. The case lid portion further includes partial enclosure side walls 19 and a front wall 18 and a partially cylindrical bottom wall 11 that collectively define an open ended enclosure that is subdivided into five elongated compartments 13 by dividers 14 in the form of integrated dividing walls.

To optimize the size of the compartments 13, the front wall 18 that is smaller than back wall 16. Providing a front wall that is between 30-70% of the dimension of the back wall has been found to support cigarettes sufficiently without impeded the ability to retrieve the cigarette from the compartment. A compartment that is too short does not support items sufficiently (unless the pivot range is sufficiently limited) and a compartment that is too long can make it difficult to retrieve product. When the pivoting angle is limited (as by detent 15) a shorter wall (less than 50%) offers advantages such as ease of access. In addition, it is important to provide enough room to accommodate an angled sealing surface on the enclosure side walls. A longer sealing surface results from a more sharply angled side wall edge (meaning the complementary angle between the side wall sealing surface and the back wall sealing surface is greater) results in resolution of a greater sealing vector and better sealing.

For this reason, the parallel side walls 19 connecting the front 18 and back 16 case surfaces should have an upper edge/sealing surface that extends at an angle α to allow sufficient sealing pressure—extending at an angle (30°-60°) preferable 45° degrees. The back wall 16, front wall 18 and angled edges of the side walls 19 provide a sealing surface that is substantially complementary to the sealing surface of the case portion, but dimensioned to provide a seal space between the case body portion 20 and the case lid portion 10.

Figure 1A:
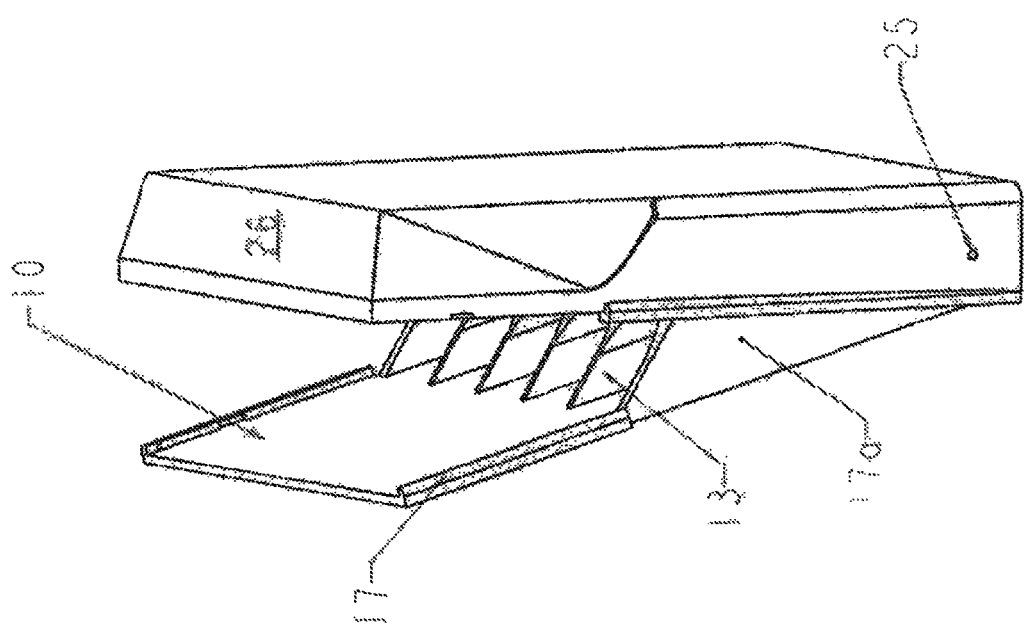
FIG. 1A is a side perspective view of an exemplary case in an open position.
Figure 1D:
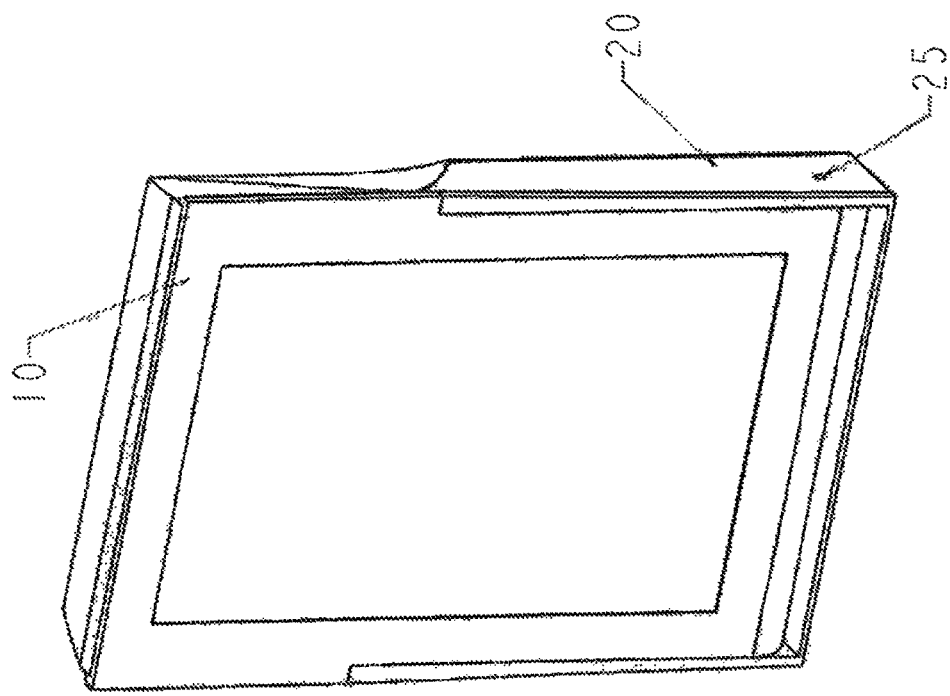
FIG. 1D is a front perspective view of the case of FIG. 1A in a closed position.
Figure 1C:
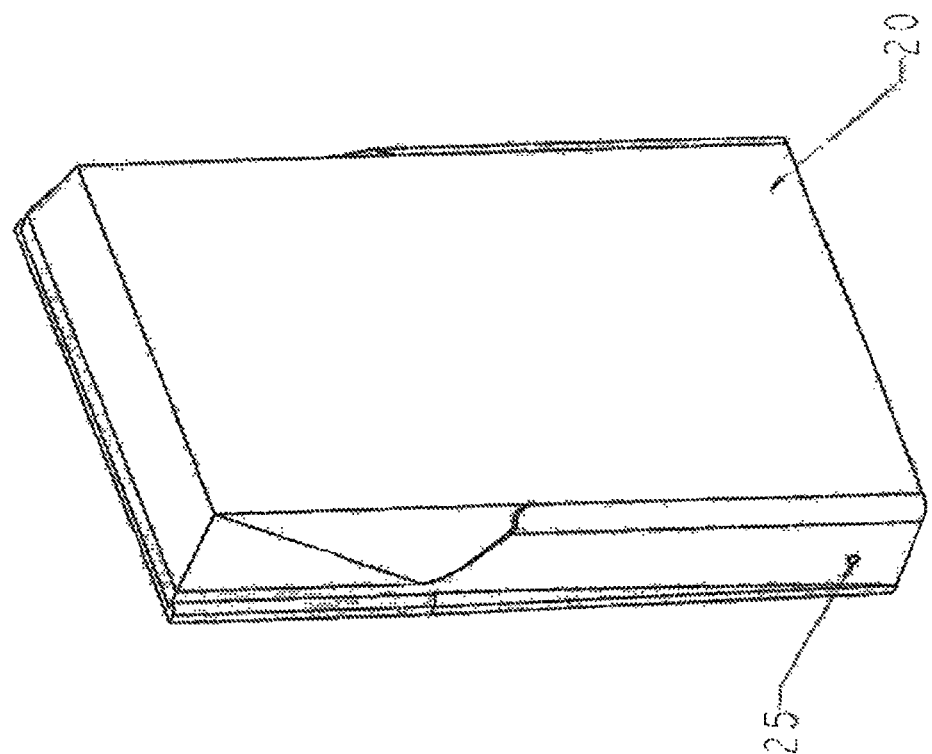
FIG. 1C is a rear perspective view of the case of FIG. 1A in a closed position.
Figure 1F:
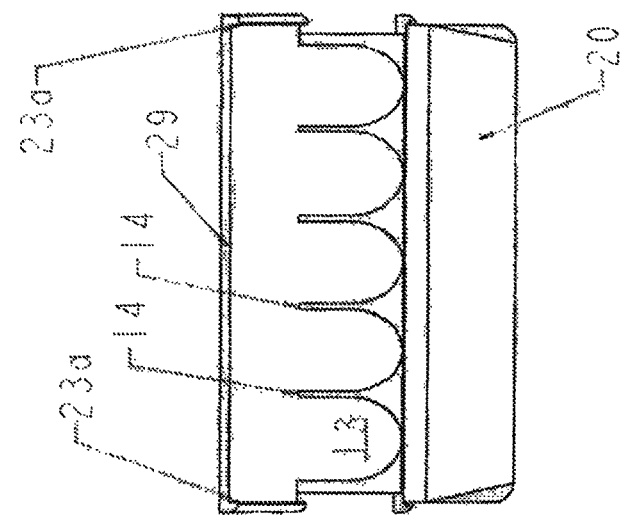
FIG. 1F is a top plan view of the case of FIG. 1A in an open position.
Figure 1E:
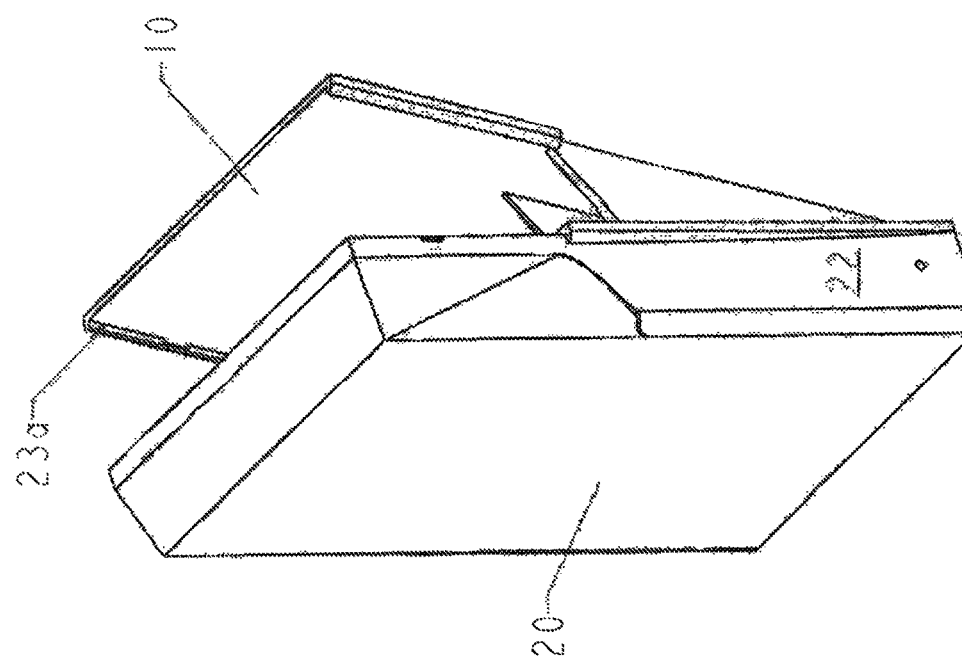
FIG. 1E is a rear perspective view of the case of FIG. 1A in an open position.
Figure 1H:
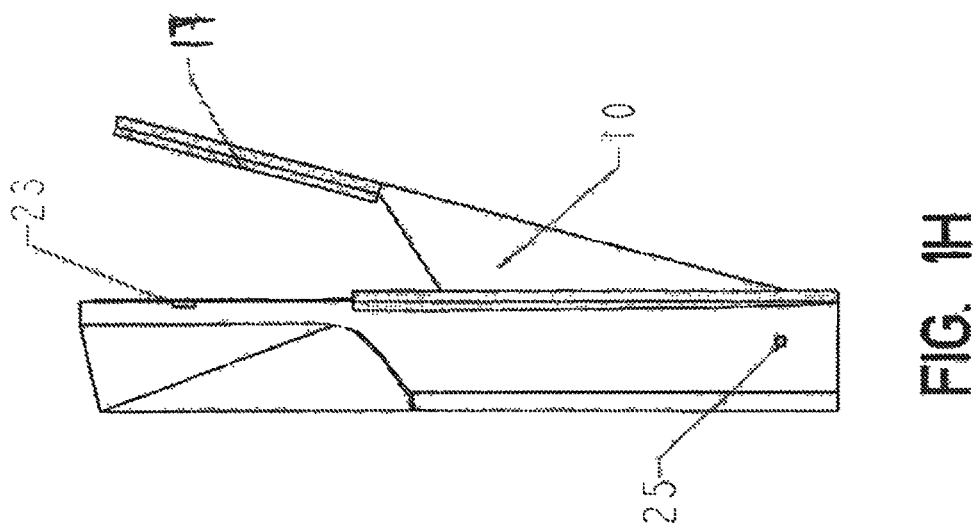
FIG. 1H is a side plan view of the case of FIG. 1A in an open position.
Figure 1G:
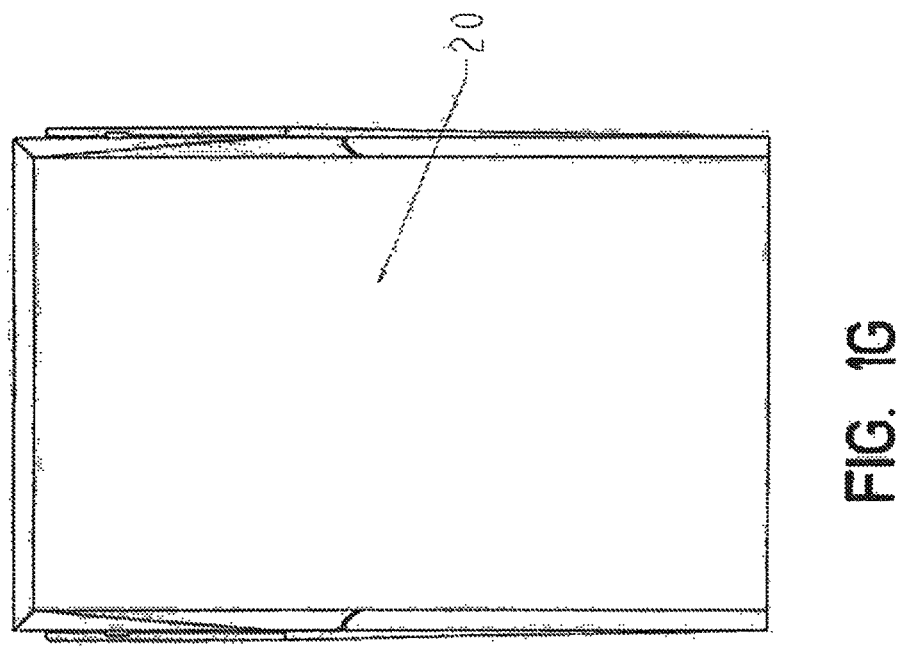
FIG. 1G is a back plan view of the case of FIG. 1A.

The bottom edge 11 has a shape that allows pivoting of the case lid within the case portion about a pivot pin/axle 25 located near the bottom of the case lid. The surface is preferably partial cylindrical and the pivot point 25 is located at a location that is equidistant from the front, back and bottom surfaces of the side walls. A round projection from the case lid portion 10 that extends into a complementary hole in the case body portion 20 may define the pivot point 25. As best shown in FIG. 2C, the case lid portion 10 has a partially cylindrical lower surface 11 to facilitate pivoting with the case body portion 20. A 15 detent may be provided to inhibit or block pivoting movement of the case beyond a certain range of movement. Limiting the range of pivoting movement to a range of 15°-30° offers aesthetic and functional advantages. For example, as shown in FIG. 1A, the edge of the front wall 18 does not pass beyond the side wall of the case body portion 20 which is desirable to ensure that the case lid portion is readily closed and doesn't flop open.

A latch lip portion 17 that cooperatively engages latch portion 23 on case body portion to secure the case lid portion 10 in a closed position in which the elastomeric seal 30 is compressed to provide both sealing force vectors and latch closure vectors.

Figures 3, 3A, 3B, 3C:
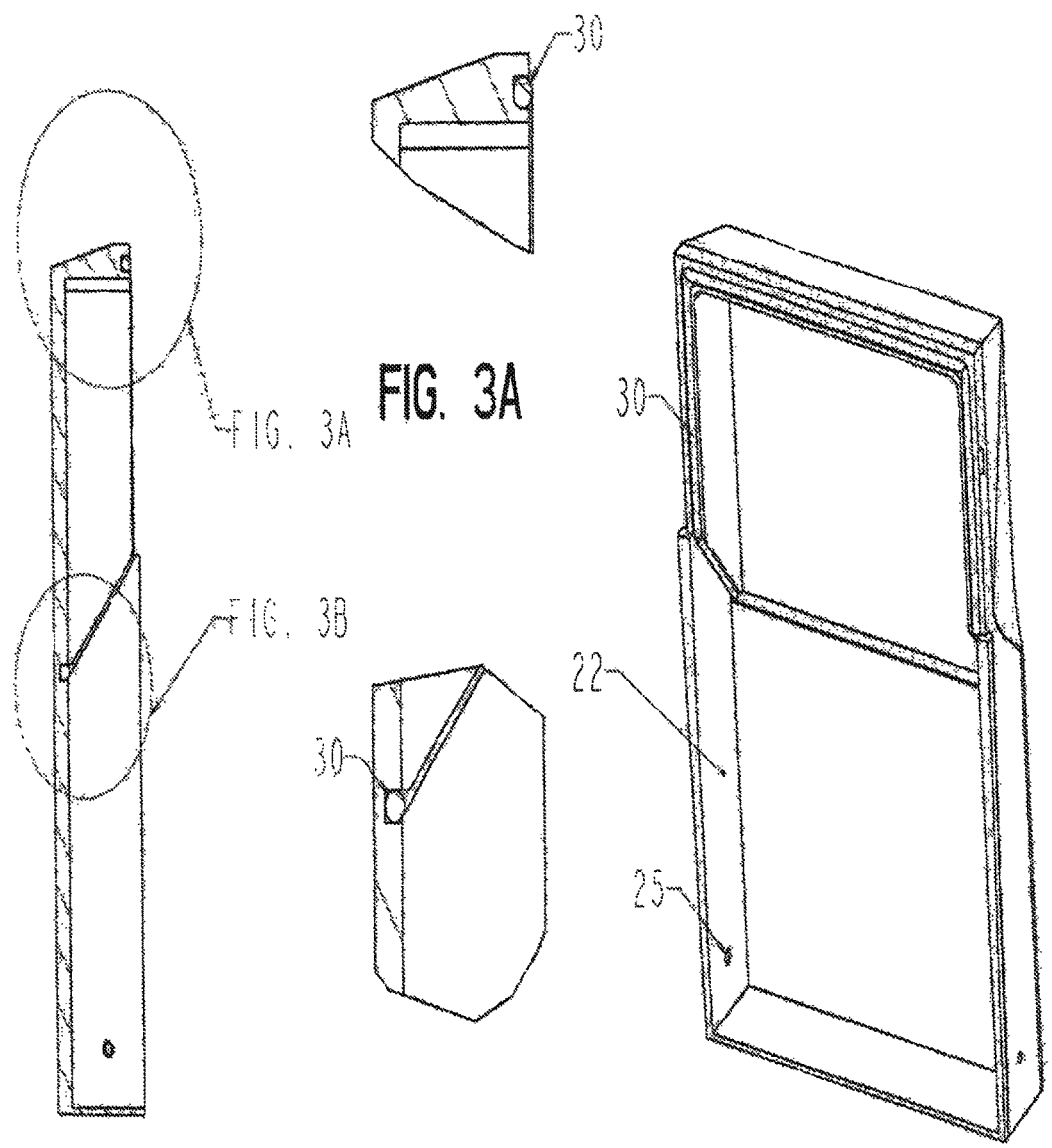
FIG. 3 is as side section of the case body portion.
FIG. 3A is as side profile of an area of the case body portion indicated in FIG. 3.
FIG. 3B is as side detail of an area of the case body portion indicated in FIG. 3.
FIG. 3C is a front perspective view of the case body portion.
Figures 3D, 3E, 3F, 3G:
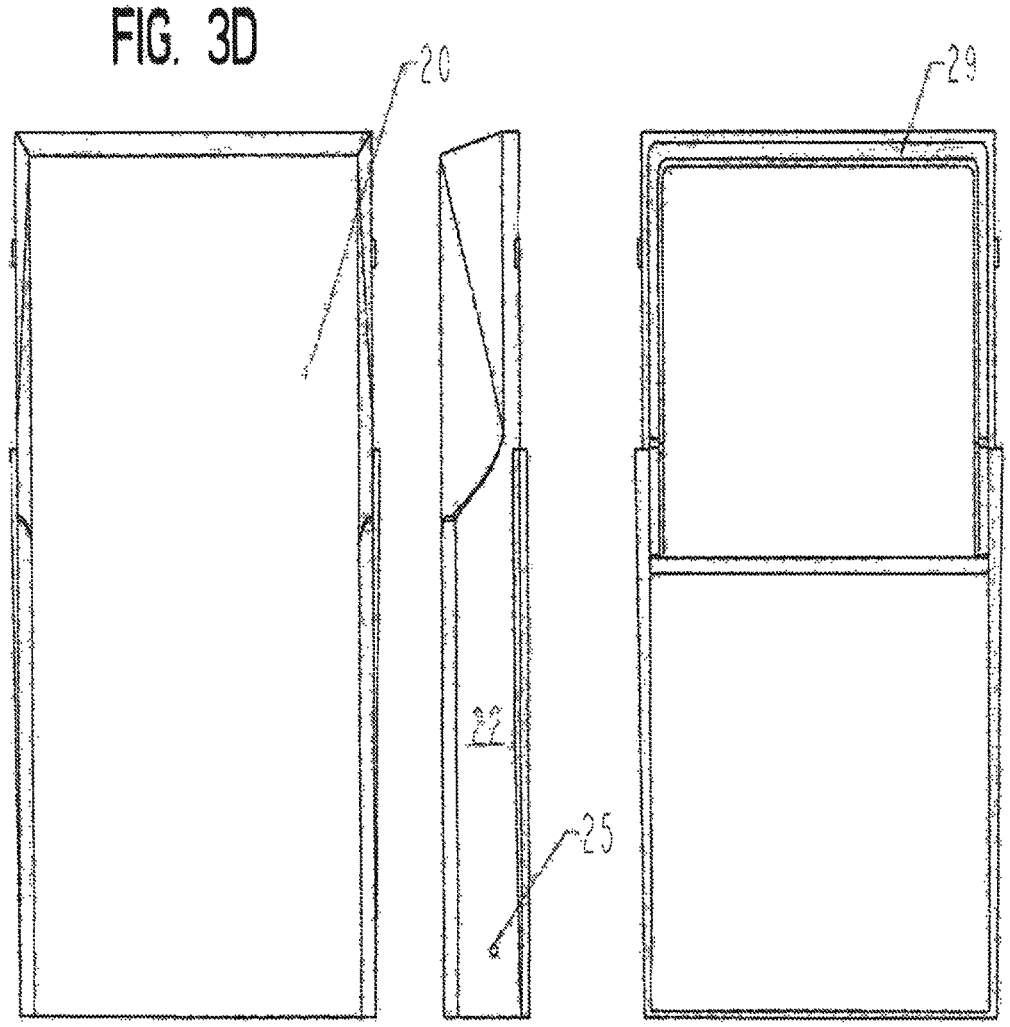
FIG. 3D is as a top plan view of the case body portion.
FIG. 3E is as a front plan view of the case body portion.
FIG. 3F is as side plan view of the case body portion.
FIG. 3G is as back plan view of the case body portion.

FIGS. 3-3G further depict details of the case body portion 20 depicted in FIGS. 1A-1H. As best shown in FIG. 3C, the case body portion 20 has an open box rectangular cuboid configuration including a back surface 21, parallel side walls 22 and parallel top 26 and bottom 27 walls, the top, bottom and side walls together defining a containing having a rectangular opening into an interior of the case body, the interior of the case body extending from distal edges of the top, bottom and side walls to an interior side of the back surface 21.

A continuous sealing surface 29 is provided on the interior of the case body portion 20. As shown, the continuous sealing surface 29 extends along the distal edge of the top wall 26, further extends along a portion of the side walls 22 and then extends at an angle α from one edge of the side wall 22 toward the opposite edge of the side wall and then across the back surface 21. The case body portion 20 further comprising a pivot opening 25 provided in each of the parallel side walls, the pivot openings 25 provided in the parallel side walls are being coaxial with one another and configured to receive the pivot pins of the case lid portion 10.

At least one body latch portion 23 is provided on the case body portion 20 and configured to engage a complementary lid latch portion 17. The body latch portion is located on a portion of the case body that can be moved from a latching position to a release position. In FIG. 3C the case body latch portion is provided on each of the two parallel side walls 22. Alternatively, a single latch could be provided on the top wall 26. In FIG. 6, the body latch portions are provided on each of the two parallel side walls 22 to engage corresponding latch portions provided on the case lid portion 10. Either or a combination of both of these latching arrangements may be provided.

To provide additional resistance to initial movement from the latched position, aligned bumps or supplemental detents 17a, 23a may be provided on adjacent surfaces of the case lid portion and case body portion 20.

As an alternative to forming the case from a distinct case body portion and case lid portion may be formed as a single piece with the lid portion 110 and body portion 120 connected by a living hinge 125, i.e., a thin flexible hinge made from the same more rigid body and lid portions. Examples of such one-piece constructions are show in FIG. 4 (a perspective view of a side hinged case) and FIG. 5 (a perspective view of a back hinged case). The constructions of FIGS. 4 and 5 can be injection molded as a single pieces. While FIGS. 4 and 5 are simplified to illustrate the living hinge, either construction would also allow injection molding of dividing walls 14 to separate the chamber into distinct compartments. The latching assemblies 17, 23 described above are also used here. The sealing surfaces 129 are defined clearly and the interior can be sealed with a seal 130 along the open edges without need for a closed shape sealing structure since the living hinge acts 125 as a reliable seal.

The containers and case components described herein are preferably formed of a biodegradable material such as a biopolymer that is both suitable for injection molding and has the requisite elasticity. Exemplary organic plastics or bioplastics include the following biopolymers Polyhydroxy alkanoates (PHB), Polyhydroxy fatty acids (PHF) and biopolymers from renewable resources, biodegradable, of plant origin such as derivates from starch, cellulose blend and lignin basis. Other materials may be used so long as they meet the functional requirements discussed herein.

FIG. 6 is a perspective view of a double latched case that is similar to the structure of FIGS. 1A-3G except that a double latch structure is provided with prong like extensions 17 that extend inside the case body and engage case latch portions provided on the interior surface of the case body portion 20.

Figure 7A:
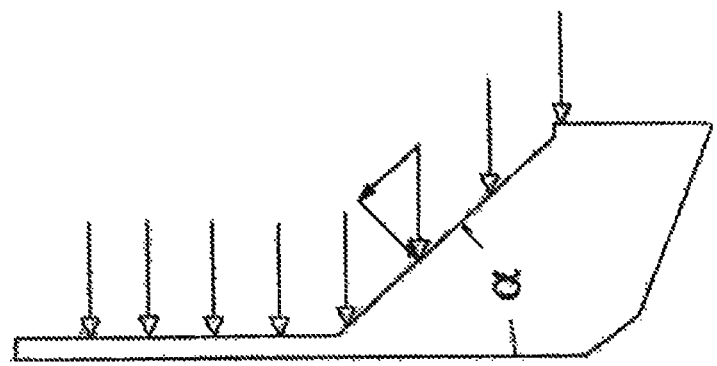
FIG. 7A is a schematic representation of the resolution of sealing vectors along an angled surface.
Figure 7:
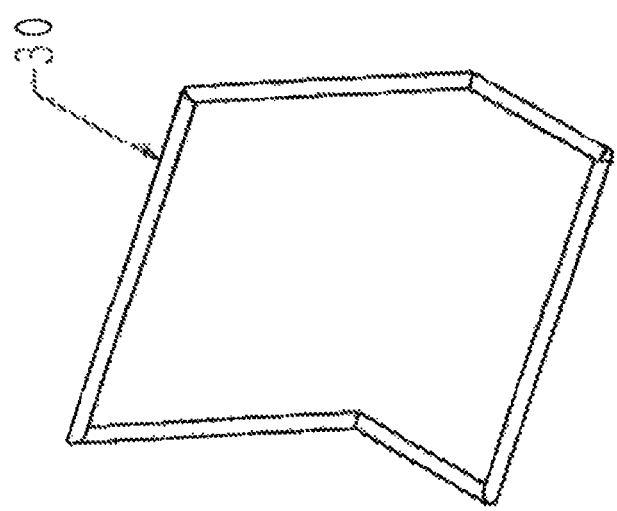
FIG. 7 is a perspective view of a closed three dimensional polygonal seal structure.

FIG. 7 depicts the continuous seal 30 by itself. As shown, the continuous seal has a closed three dimensional polygonal shape that is complementary to the shape of the sealing surface on the respective case portion and case body portion. The seal 30 is made of an elastomer that is preferably softer than the material used in the case lid portion and case body portion. The seal 30 is preferably made of a material having properties making it resistant to contaminants such as oil, water and the like. The seal 30 is dimensioned to be larger than the gap between adjacent sealing surfaces 29. With this seal structure, when the case is latched, the elastomer remains in a somewhat compressed state and exerts a force along the entire perimeter of the adjacent sealing surfaces 29. An opposing force presses the latch 23 and lip 17 against one another to retain the latch in the closed position. The force along the sealing surface is generally substantially perpendicular to the sealing surfaces to maximize sealing force. However, as illustrated schematically in FIG. 7A, where the edges of the adjacent sealing surfaces are angled (angle α), the return force of the compressed elastomer resolves into a sealing vector (a force pressing the elastomer into the adjacent sealing surface) along the entire closed three dimensional polygonal path of the seal. As angle α becomes larger, the sealing vector is reduced. Conversely, reducing the size of angle α results in a substantial increase in the length of the angle surface. To obtain an appropriate balance between sealing vector and angled surface dimension the parallel side walls 19 connecting the front 18 and back 16 case surfaces should have an upper edge/sealing surface that extends at an angle α of 30°-60°, preferably 45° degrees.

An additional latching force may be obtained if the top of the case is elastomeric or elastic enough that the latch 23 must be depressed to move the lip into the latching position. The "spring back" force of the walls (side/top) of the case will push the lip and the latch into engagement and vectors of the opposing force will resolve to sealing vectors to ensure a tighter seal. Thus, the case functions as a reusable substantially airtight child resistant cigarette container with a plurality of elongated compartments for containing individual cigarettes.

FIG. 8 depicts a case similar to that shown in FIGS. 1A-3H except that an extended divider wall 114 is provided to define an extended compartment 113 that has an integral lid 116 connected to the compartment by a living hinge. This structure provides a sealed off compartment/chamber 113 that can be opened and closed independent of the other chambers 13. Naturally multiple independent chambers could be provided using the same structure. The designs depicted are exemplary and the number of compartments 13, 113 and the arrangement and assortment of open 13 and closed 113 compartments can be varied as desired.

FIG. 9 depicts a case having a clamshell design and an alternative top latch structure 217, 223. As shown, the lid latch portion 217 is a wedge shaped detent. The case body latch portion is a pivotally mounted latch 223 that has an over center snap action to bias the latch portion 223 into the engaged position when the latch portion 223 is moved being the over center position. The clamshell case design shown may be injection molded as single as a one piece case with a lid portion 210 and body portion 220 connected by a living hinge 225, i.e., a thin flexible hinge made from the same more rigid body and lid portions injection molded as a single pieces. While FIG. 9 is simplified to illustrate the living hinge, dividing walls 14 would be provided on one of the portions 210, 220 to separate the chamber into distinct compartments. Further, one or more extended dividing walls 114 could be provided to define separately sealed extended compartments 113 with lid 116 may be provided. The latching portion 223 could be formed integrally with a living hinge, but a separate latch portion is depicted. The latch portion 217 may be integrally formed or provided separately. The sealing surfaces 229 are defined clearly and the interior can be sealed with a seal 230 along the open edges without need for a closed shape sealing structure since the living hinge acts 225 as a reliable seal.

FIG. 10 is a sectional view of an integral pin lock construction that may be used in addition to or in lieu of the latching mechanisms described herein. The pin lock construction provided a pin that is biased into a locked position where a locking pin 277 extends from one case component 20 into an opening formed in the adjacent case component 10. The pin lock construction shown in FIG. 10 is integrally formed as a single piece with at least one of the case components 20. The pin lock comprises the locking pin 277, a release knob 270 and one or more elastic ligaments 273 that retain the locking pin 277 in a locking position as shown in FIG. 10. The locking pin 277 may be moved to an unlocked position by using the knob 270 to exert force on the elastic ligament(s) to stretch the ligaments(s) and displace the locking pin from the locked position. When the force is released, the ligaments and locking pin return to their static position, but if the case is opened it will remain open with the locking pin preventing closure unless the pin is retracted by stretching the ligaments. To achieve the locking function described in an integral construction, the construction includes a knob portion 270 having locking pin 277 extending therefrom through a hole in the case body portion 20 and beyond the inside surface of the case body portion (i.e., in a "locking position"). A plurality of elastic ligaments 273 are provided. The ligaments 273 are preferably equi-spaced from the locking pin 277 and extend from the knob 270 to the case body portion 20. The ligaments are dimensioned (sufficiently thin) to provide elasticity sufficient to permit displacement of the locking pin 277 from the position shown to a release position where the locking pin is retracted from the locking hole in the adjacent case portion 10.

FIG. 11 is a schematic section sectional view of a friction seal construction. The construction shown includes a friction seal 23F (as opposed to a compression seal). When the friction seal 23F is pressed against the sealing surfaces 29 on adjacent case opponents 10, 20 the forces acting on both side walls of the friction seal 23F would create the seal, as opposed to the compressive forces on the top and bottom. In the view shown in FIG. 11, the friction seal acts on opposed parallel sealing surfaces and is spaced from the adjacent surfaces.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

The invention claimed is:

1. A container comprising:
   a case body portion having an open box rectangular cuboid configuration including a back surface, parallel side walls and parallel top and bottom walls, the top, bottom and side walls together defining a containing having a rectangular opening into an interior of the case body, the interior of the case body extending from distal edges of the top, bottom and side walls to an interior side of the back surface;
   the case body portion further comprising a first continuous sealing surface provided on the interior of the case portion, the first continuous sealing surface extending along the distal edge of the top wall and extending along a portion of the side walls and then extending at an angle from one edge of the side wall toward the opposite edge of the side wall and then across the back surface
   the case body portion further comprising at least one body latch portion configured to engage a complementary lid latch portion, the at least one body latch portion located on a portion of the case body that is movable from a latching position to a release position
   the case body portion further comprising a pivot opening provided in each of the parallel side walls, the pivot openings provided in the parallel side walls being coaxial with one another;
   a case lid portion comprising a back wall complementary to the rectangular opening defined by the top, bottom and side walls of the case body portion, a front wall that is smaller than back wall, parallel side walls extending from the front wall to the back wall so as to define a straight back side edge and a straight front side edge, and a partially cylindrical bottom wall, the front wall, parallel side walls, partially cylindrical bottom wall and a portion of the back wall together defining a storage chamber;
   a plurality of dividing walls provided within the storage chamber and extending from the back wall to the front wall to divide the storage chamber into at least three compartments;
   wherein the parallel side walls connecting the front wall and back wall of the case lid portion have an inclined upper edge and a sealing surface portion defined at the upper edge and wherein the inclined upper edge and sealing surface extend at an acute angle of inclination relative to the straight back edge and wherein the upper edge and sealing surface portion extend at a complementary obtuse angle of inclination relative to the straight front edge such that a portion of a sealing force applied in a direction perpendicular to the back wall is resolved into a sealing vector that is perpendicular to the inclined upper edge
   wherein the back wall of the case lid portion, front wall of the case lid portion and inclined upper edges of the side walls of the case lid portion together define a second continuous sealing surface that is complementary to the first continuous sealing surface of the case body portion, but dimensioned to provide a seal space between the case body portion and the case lid portion
   wherein the partially cylindrical bottom wall of the case lid portion has a shape that allows pivoting of the case lid portion within the case body portion about a pivot point between an open position and a closed position and wherein the pivot point is located equidistant from the back wall of the case lid portion, front wall of the case lid portion and a bottom surface of the case lid portion the case lid portion further comprising at least one lid latch portion configured to engage a complementary body latch portion, the at least one lid latch portion located on the back wall of the case lid portion a continuous elastomeric seal provided in the seal space between the complementary first and second continuous sealing surfaces, wherein the continuous elastomeric seal is configured to be compressed along the entire length of the complementary first and second continuous sealing surfaces when the case lid portion is pivoted into the latched position, the compressed continuous elastomeric seal providing a spring force that retains a latch in the latched position and a spring force that is resolved into sealing vectors perpendicular to the sealing surface along the entire length of the sealing surface portion to ensures a seal along the sealing surface portion.

2. The container of claim 1, wherein the continuous sealing surface extends along a portion of the side walls that is between 30-70% of the length of the side walls.

3. The container of claim 1, wherein the continuous sealing surface extends at an angle of between 30° and 60° from one edge of the side wall toward the opposite edge of the side wall.

4. The container of claim 1, wherein the at least one body latch portion comprises a latch portion configured as an integral portion of each of the two parallel side walls that is spaced from the back, top and bottom side walls so that the at least one body latch portions are flexible inward by application of release force to move the at least one body latch portion to the release position and wherein the elasticity of the side walls moves the latch portions toward the latched position when the release force is removed.

5. The container of claim 1, wherein the at least one body latch portion is configured as an integral portion of the top wall spaced from the back and side walls so that the at least one body latch portion are flexible down by application of release force to move the at least one body latch portion to the release position and wherein the elasticity of the top wall moves the latch portion toward the latched position when the release force is removed.

6. The container of claim 1, wherein the pivot openings in the side walls are provided at a location that is equidistant from the front wall, the back wall at the bottom wall.

7. The container of claim 1, wherein the front wall of the case lid portion has a height that is in the range of 30-70% of the height of the back wall.

8. The container of claim 1, wherein the front wall of the case lid portion has a height that is less than 50% of the height of the back wall.

9. The container of claim 1, wherein the acute angle of inclination is in the range of 30°-60° to ensure that the sealing vector provides sufficient sealing force.

10. The container of claim 1, further comprising a pivot restriction detent provided on the partially cylindrical bottom wall of the case lid portion to restrict the range of pivoting from the closed position.

11. The container of claim 10, wherein the pivot restriction detent provided on the partially cylindrical bottom wall of the case lid portion restricts the range of pivoting from the closed position to an open position that is between 15°-30° from the closed position.

12. The container of claim 1, further comprising a closure detent to inhibit movement of the lid from the closed position to an open position so that a user must apply force to move the lid past the detent.

13. The container of claim 1, wherein the storage chamber of the case lid portion is airtight except at the opening that defines the second continuous sealing surface.

14. The container of claim 1, wherein the plurality of dividing walls separate the chamber into at least three discrete compartments each having a length, width and depth to hold elongated product and where the depth is preferable at least three times length or width of the chamber.

15. The container of claim 1, wherein the continuous elastomeric seal is secured to the case body portion and pressed into contact with the case lid portion when the case lid portion is moved into the latched position.

16. The container of claim 1, wherein the continuous elastomeric seal comprises an extrusion of compressible material that is a closed shape polygonal shape.

17. The container of claim 1, further comprising an integral locking pin construction, the integral locking pin construction comprising a knob portion having a locking pin extending therefrom through a hole in the case body portion, a plurality of elastic ligaments extending from the knob to the case body portion, the plurality of elastic ligaments configured to provide elasticity to permit displacement of the locking pin from a locking position to a release position.

18. The container of claim 1, further comprising an extended divider wall defining an extended compartment and an integral lid connected to the extended compartment by a living hinge.

19. A container comprising:
  a case body portion having an open box rectangular cuboid configuration including a back surface, parallel side walls and parallel top and bottom walls, the top, bottom and side walls together defining a containing having a rectangular opening into an interior of the case body, the interior of the case body extending from distal edges of the top, bottom and side walls to an interior side of the back surface;
  the case body portion further comprising a first continuous sealing surface provided on the interior of the case portion, the first continuous sealing surface extending along the distal edge of the top wall and extending along a portion of the side walls and then extending at an angle from one edge of the side wall toward the opposite edge of the side wall and then across the back surface
  the case body portion further comprising at least one body latch portion configured to engage a complementary lid latch portion, the at least one body latch portion located on a portion of the case body that is movable from a latching position to a release position
  the case body portion further comprising a pivot opening provided in each of the parallel side walls, the pivot openings provided in the parallel side walls being coaxial with one another;
  a case lid portion comprising a back wall complementary to the rectangular opening defined by the top, bottom and side walls of the case body portion, a front wall that has a height that is in the range of 30-70% of the height of the back wall, parallel side walls extending from the front wall to the back wall so as to define a straight back side edge and a straight front side edge, and a partially cylindrical bottom wall, the front wall, parallel side walls, partially cylindrical bottom wall and a portion of the back wall together defining a storage chamber that is airtight except at the opening that defines the sealing surface;

at least one dividing wall provided within the storage chamber and extending from the back wall to the front wall to divide the storage chamber into at least two compartments;

wherein the parallel side walls connecting the front wall and back wall of the case lid portion have an inclined upper edge and a sealing surface portion defined at the upper edge and wherein the inclined upper edge and sealing surface extend at an angle of inclination of between 30° and 60° relative to the straight back edge and wherein the upper edge and sealing surface portion extend at a complementary obtuse angle of inclination relative to the straight front edge such that a portion of a sealing force applied in a direction perpendicular to the back wall is resolved into a sealing vector that is perpendicular to the inclined upper edge wherein the back wall of the case lid portion, front wall of the case lid portion and inclined upper edges of the side walls of the case lid portion together define a second continuous sealing surface that is complementary to the first continuous sealing surface of the case body portion, but dimensioned to provide a seal space between the case body portion and the case lid portion wherein the partially cylindrical bottom wall of the case lid portion has a shape that allows pivoting of the case lid portion within the case body portion about a pivot point between an open position and a closed position and wherein the pivot point is located equidistant from the back wall of the case lid portion, front wall of the case lid portion and a bottom surface of the case lid portion the case lid portion further comprising at least one lid latch portion configured to engage a complementary body latch portion, the at least one lid latch portion located on the back wall of the case lid portion a continuous elastomeric seal provided in the seal space between the complementary first and sealing surfaces, wherein the continuous elastomeric seal is configured to be compressed along the entire sealing length of the complementary first and second continuous sealing surfaces when the case lid portion is pivoted into the latched position, the continuous compressed elastomeric seal providing a spring force that retains a latch in the latched position and a spring force that is resolved into sealing vectors perpendicular to the sealing surface portion along the entire length of the sealing surface portion to ensures a seal along the sealing surface portion.

20. The container of claim 19, further comprising an integral locking pin construction, the integral locking pin construction comprising a knob portion having a locking pin extending therefrom through a hole in the case body portion, a plurality of elastic ligaments extending from the knob to the case body portion, the ligaments configured to provide elasticity sufficient to permit displacement of the locking pin from a locking position to a release position.

* * * * *